United States Patent
Kanemitsu

(10) Patent No.: US 8,314,956 B2
(45) Date of Patent: Nov. 20, 2012

(54) PULL PRINTING SYSTEM WITH PLURALITY OF PERMITTED RECIPIENTS

(75) Inventor: Shigenaka Kanemitsu, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 930 days.

(21) Appl. No.: 12/398,715

(22) Filed: Mar. 5, 2009

(65) Prior Publication Data
US 2009/0310166 A1    Dec. 17, 2009

(30) Foreign Application Priority Data
Jun. 13, 2008    (JP) .................. 2008-154895

(51) Int. Cl.
G06K 15/00    (2006.01)
G06F 3/12    (2006.01)
G03G 21/02    (2006.01)
G03G 15/00    (2006.01)

(52) U.S. Cl. .......... 358/1.14; 358/1.15; 399/79; 399/80

(58) Field of Classification Search .............. 358/1.14, 358/1.15; 399/79, 80
See application file for complete search history.

(56) References Cited

U.S. PATENT DOCUMENTS

| | | | |
|---|---|---|---|
| 2001/0053295 A1* | 12/2001 | Kujirai et al. | 399/79 |
| 2002/0027673 A1* | 3/2002 | Roosen et al. | 358/1.13 |
| 2003/0197887 A1* | 10/2003 | Shenoy et al. | 358/1.15 |
| 2004/0148335 A1* | 7/2004 | Keeney et al. | 709/201 |
| 2008/0165372 A1* | 7/2008 | Yamada et al. | 358/1.4 |
| 2009/0059275 A1* | 3/2009 | Tomita | 358/1.15 |

FOREIGN PATENT DOCUMENTS

JP    2006-235981    9/2006

\* cited by examiner

*Primary Examiner* — Twyler Haskins
*Assistant Examiner* — Fred Guillermety
(74) *Attorney, Agent, or Firm* — K&L Gates LLP

(57) ABSTRACT

A printing system comprising: a terminal device; and a printing apparatus. The terminal device comprises: a job information generation unit for generating job information including identification information on a job issuer, and identification information with respect to the permitted recipient; and a job information transmission unit for transmitting the job information generated by the job information generation unit. The printing apparatus comprises: a permitted recipient information reception unit for receiving the identification information with respect to the permitted recipient; a job information reception unit for receiving the job information transmitted from the job information transmission unit; and a job execution unit for executing a printing process based on the job information including identification information with respect to a permitted recipient, which matches the identification information with respect to the permitted recipient received by the permitted recipient information reception unit, and outputting printed material related thereto.

13 Claims, 7 Drawing Sheets

FIG.4
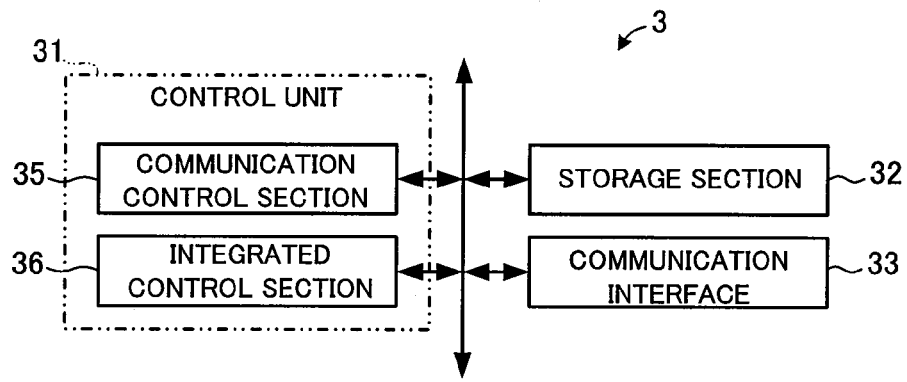
FIG.5
| STATUS INFORMATION | STATUS OF PERMITTED RECIPIENT (UNEXECUTED/EXECUTED) |
| --- | --- |
| | STATUS OF PERMITTED RECIPIENT (UNEXECUTED/EXECUTED) |
| | STATUS OF PERMITTED RECIPIENT (UNEXECUTED/EXECUTED) |
| | ⋮ |
FIG.6
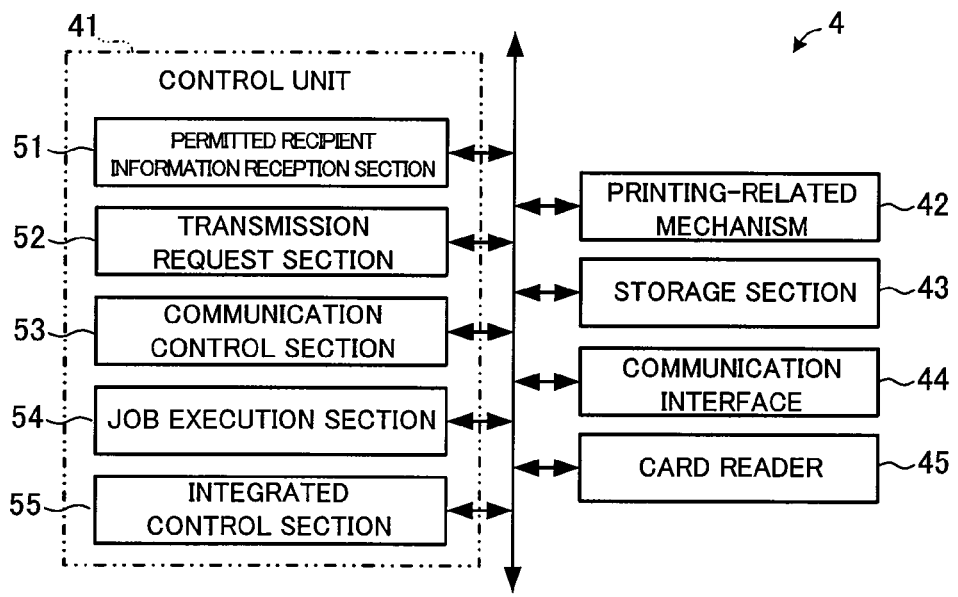

PULL PRINTING SYSTEM WITH PLURALITY OF PERMITTED RECIPIENTS

INCORPORATION BY REFERENCE

This application is based upon and claims the benefit of priority from the corresponding Japanese Patent Application No. 2008-154895, filed Jun. 13, 2008, the entire contents of which is incorporated herein by reference.

BACKGROUND

1. Field of the Invention

The present invention relates to a printing system for printing documents, photographs, drawings, and the like.

2. Description of the Related Art

Printing systems are known that include a terminal device, a job server, and a printing apparatus.

Such printing systems employ a method called "pull print". When a worker wants to print a document or the like onto a sheet of paper, the worker first uses a terminal device to input a job issuance instruction indicating that a job for printing a document or the like should be issued to the terminal device. In response thereto, the terminal device generates job information including print data with respect to the document or the like, and transmits the job information to the job server. The job server receives the job information transmitted from the terminal device, and stores the job information. Then, the worker uses the printing apparatus to input a job execution instruction indicating that the job for printing the document or the like should be executed by the printing apparatus. In response thereto, the printing apparatus requests the job server to transmit the job information thereto, receives the job information transmitted from the job server in response to the request, and executes the job based on the job information. In this manner, the document, or the like, is printed onto a sheet of paper, and the worker receives a printed matter related thereto.

In such a printing system, the following method is used to ensure the security of the document, or the like, at the time of printing thereof. When the worker uses the terminal device, the worker inputs his/her own identification information (for example, password) in the terminal device authenticating himself/herself as a registered worker. The terminal device reads the identification information on the worker, and when generating the job information, adds the identification information on the worker to the job information. Meanwhile, when the worker uses the printing apparatus, the worker inputs his/her own identification information into the printing apparatus to thereby have himself/herself authenticated as a registered worker. The printing apparatus reads the identification information on the worker, and when making the request of the job server to transmit the job information, sends the identification information on the worker to the job server along with a command to request transmission of the job information. The job server transmits the job information to which identification information is added that matches the identification information on the worker transmitted from the printing apparatus to the printing apparatus. This allows the worker to execute only the job issued by the worker himself/herself. Therefore, it is possible to prevent access to a job issued by a given worker that has been executed by another person without permission and also to prevent the improper use or disclosure of printed matter on which a related document or the like is printed.

In the above-described printing system, wherein security is ensured by identification information input directly by the worker, no one can perform a job but the worker who has generated the job himself/herself. This makes it difficult and inconvenient for the worker who has generated a job to ask another person who has security clearance to perform the job and obtain the printed material related thereto. That is, the above-described printing system sacrifices convenience for security.

SUMMARY

In an embodiment of the present invention, there is provided a printing system comprising: a terminal device; a server device; and a printing apparatus.

The terminal device comprises: a permitted recipient information storage unit for storing identification information with respect to a permitted recipient associated with a job issuer; a job information generation unit for reading the identification information, and generating job information including identification information with respect to the job issuer, the identification information on the permitted recipient, and print data; and a first job information transmission unit for transmitting the job information generated by the job information generation unit to the server device.

The server device comprises: a first job information reception unit for receiving the job information transmitted by the first job information transmission unit; a job information storage unit for storing the job information received by the first job information reception unit; and a second job information transmission unit for transmitting the job information stored in the job information storage unit to the printing apparatus in response to a request made by the printing apparatus.

The printing apparatus comprises: a permitted recipient information reception unit for receiving the identification information with respect to the permitted recipient; a transmission request unit for making a request of the server device to transmit, to a second job information reception unit, the job information including identification information on a permitted recipient, which matches the identification information with respect to the permitted recipient received by the permitted recipient information reception unit; the second job information reception unit for receiving the job information transmitted from the second job information transmission unit in response to the request made by the transmission request unit; and a job execution unit for executing a printing processing based on the job information received by the second job information reception unit, and outputting printed material related thereto.

Further, according to another embodiment of the present invention, a printing system is provided, comprising: a terminal device; and a printing apparatus.

The terminal device comprises: a permitted recipient information storage unit for storing identification information with respect to a permitted recipient associated with a job issuer; a job information generation unit for reading the identification information, and generating job information including identification information on the job issuer, the identification information on the permitted recipient, and print data; and a job information transmission unit for transmitting the job information generated by the job information generation unit to the printing apparatus.

The printing apparatus comprises: a job information reception unit for receiving the job information transmitted by the job information transmission unit; a job information storage unit for storing the job information received by the job information reception unit; a permitted recipient information reception unit for receiving the identification information with respect to the permitted recipient; and a job execution unit for executing a printing processing based on the job information including identification information with respect to a permitted recipient, which matches the identification information with respect to the permitted recipient received by the permitted recipient information reception unit, and outputting printed material related thereto.

Further, according to another embodiment of the present invention, a printing method is provided, comprising: providing a terminal, a server, and a printer; storing identification information on a permitted recipient associated with a job issuer on the terminal; reading the identification information with respect to the permitted recipient from the terminal, and generating job information including identification information on the job issuer, the identification information with respect to the permitted recipient, and print data; and transmitting the job information to the server, the server receiving the job information and storing the job information, transmitting the job information stored by the server to the printer in response to a request made by the printer, the printer receiving the identification information with respect to the permitted recipient; the printer making a request of the server to transmit the job information including identification information on a permitted recipient, which matches the identification information with respect to the permitted recipient received by the printer; and executing a printing process based on the job information received and outputting printed material related thereto.

Additional features and advantages are described herein, and will be apparent from the following Detailed Description and the figures.

BRIEF DESCRIPTION OF THE FIGURES

In the accompanying drawings:

FIG. 4 is a block diagram illustrating an internal configuration of a job server of the printing system according to an embodiment of the present invention;

FIG. 5 is a diagram illustrating a structure of status information generated by the job server within FIG. 4;

FIG. 6 is a block diagram illustrating an internal configuration of a printing apparatus of the printing system according to the embodiment of the present invention;

DETAILED DESCRIPTION

A description of an embodiment according to the present invention with reference to the drawings will now be given.

Figure 1:
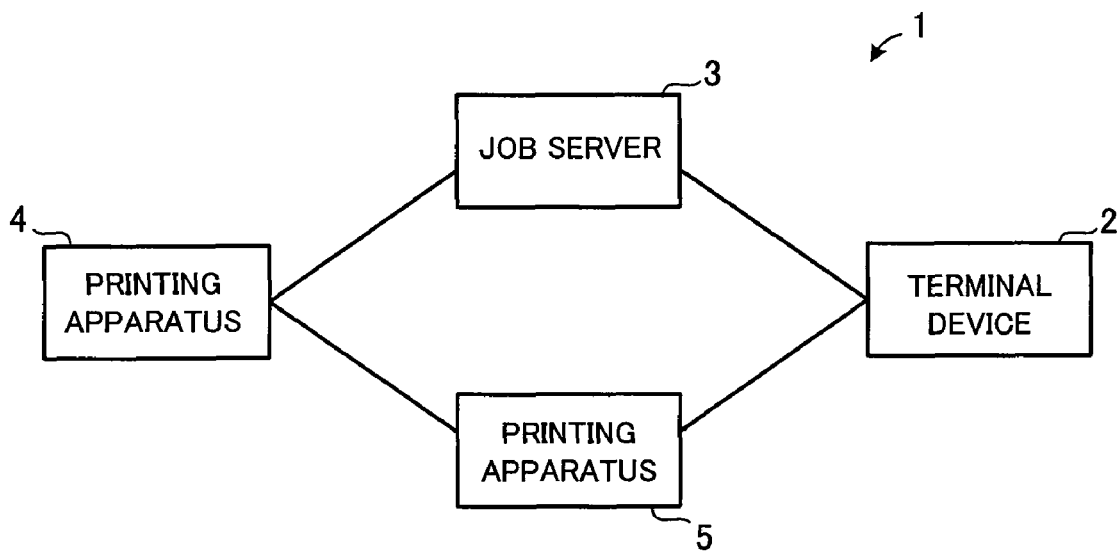
FIG. 1 is a block diagram illustrating a printing system according to an embodiment of the present invention.

FIG. 1 illustrates a printing system according to an embodiment of the present invention. As illustrated in FIG. 1, a printing system 1 includes a terminal device 2, a job server 3, a printing apparatus 4, and an authentication server 5. The terminal device 2 is, for example, a personal computer. The job server 3 is, for example, a server computer. It should be noted that the job server 3 is a specific example of a server device. The printing apparatus 4 is, for example, a printer or a multifunction peripheral. The authentication server 5 is, for example, a server computer, and has a worker registration information database in which worker registration information including identification information on registered workers is stored. The terminal device 2 is connected to each job server 3 and the authentication server 5 via a computer network, or the like, so as to allow communications to be performed therebetween. The printing apparatus 4 is connected to each job server 3 and the authentication server 5 via the computer network, or the like, so as to allow communications therebetween.

The printing system 1 uses a so-called "pull print" method. That is, in the printing system 1, the terminal device 2 transmits job information from the terminal device 2 to the job server 3 when the job is issued, and the job server 3 temporarily stores the job information. When a job is performed, the job server 3 transmits the stored job information to the printing apparatus 4, and the printing apparatus 4 performs a printing process based on the job information.

In addition, the printing system 1 has a job executer expansion function. In the printing system 1, wherein a first worker operates the terminal device 2 to issue a job, not only the first worker who generated the job but also another worker selected by the first worker can execute the job (in other words, the printing process). Hereinafter, the worker who operates the terminal device 2 to issue a job is referred to as "job issuer". In addition, another worker who is permitted by the job issuer to execute the job generated by the job issuer is referred to as "permitted recipient". That is, the permitted recipient represents a worker who is permitted by the job issuer to receive printed material that is output from the printing apparatus 4 by the execution of the job generated by the job issuer.

The permitted recipient is decided for each worker in advance. For example, the permitted recipient can be arbitrarily selected by the worker in advance. Further, the worker can set all of members of a group (such as department, division, or company) to which the worker belongs as permitted recipients. Identification information on the permitted recipients (decided in advance) is stored in a storage section 12 (see FIG. 2) of the terminal device 2 in association with each worker.

The job issuer can select all of a plurality of permitted recipients associated with the job issuer as persons who are actually permitted to execute the job. Alternatively, the job issuer can select one person or a plurality of persons from among the plurality of permitted recipients associated with the job issuer as the persons who are actually permitted to execute the job.

Figure 2:
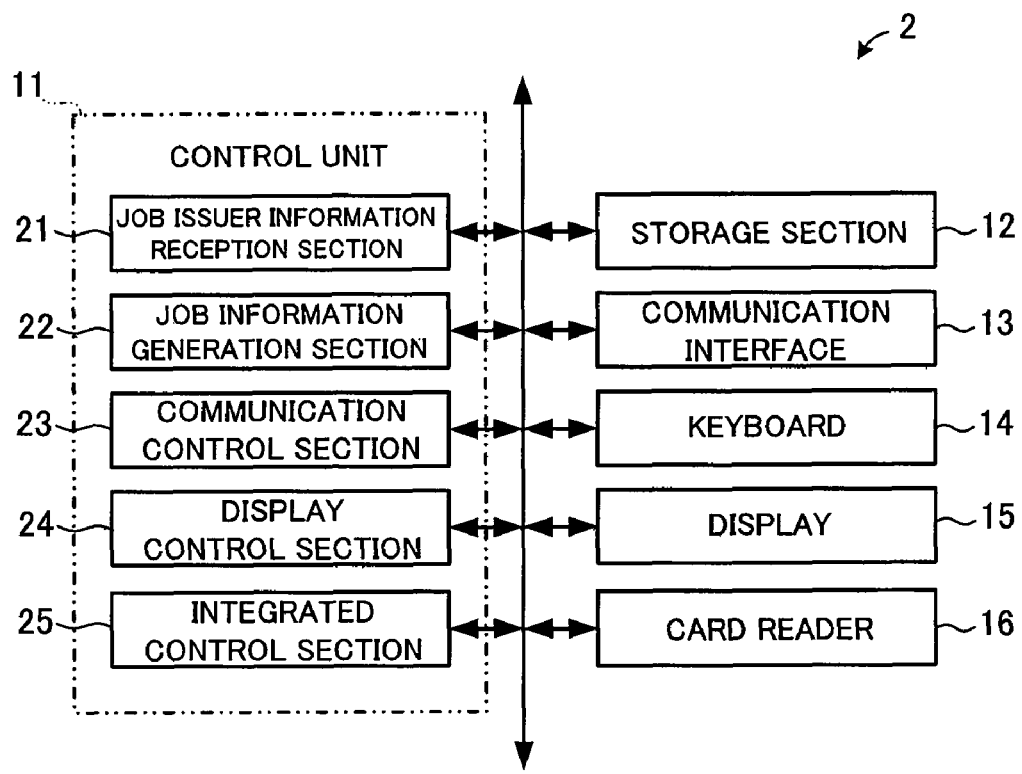
FIG. 2 is a block diagram illustrating an internal configuration of a terminal device of the printing system according to an embodiment of the present invention.
Figure 3:
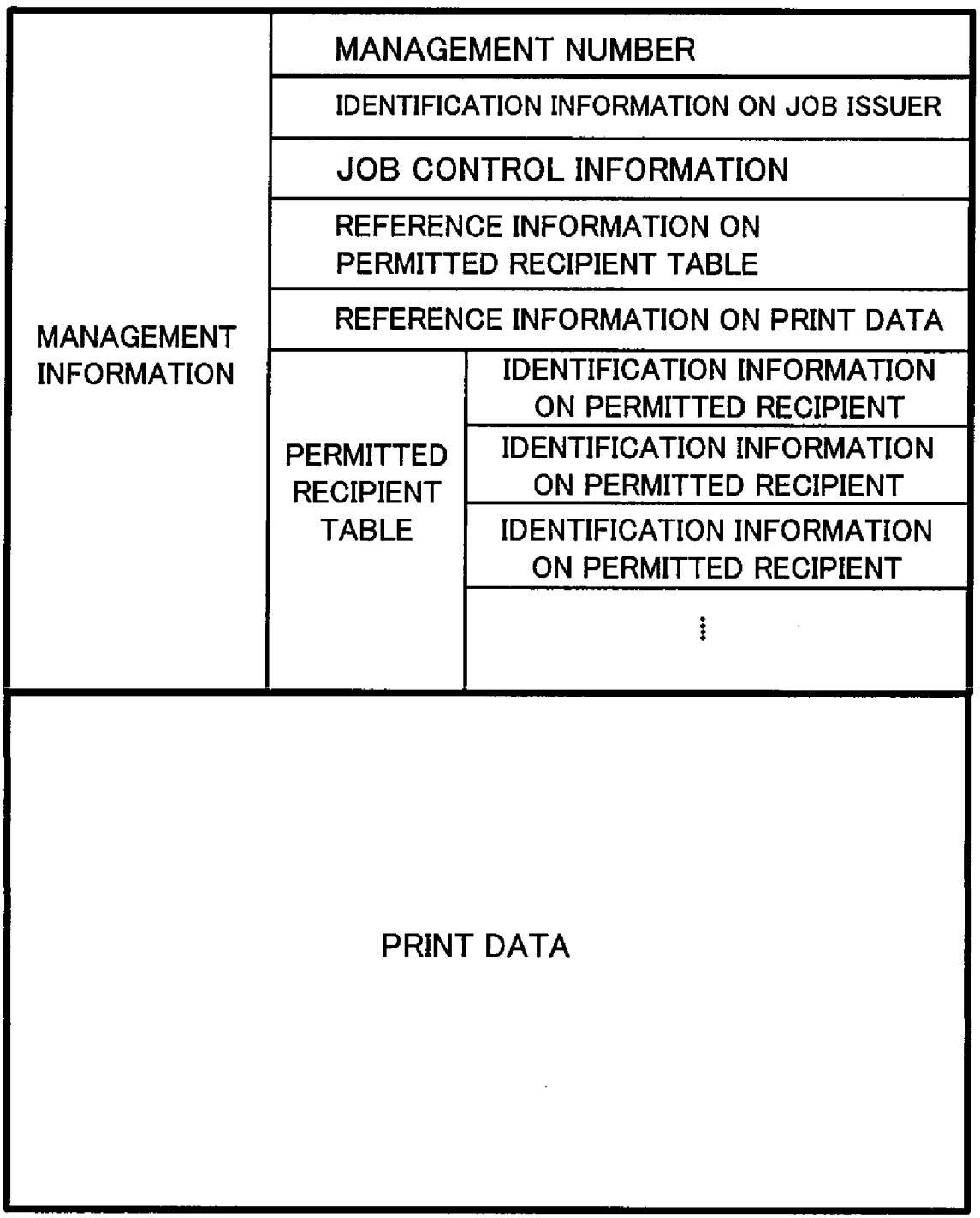
FIG. 3 is a diagram illustrating a structure of job information generated by the terminal device within FIG. 2.

FIG. 2 illustrates an internal configuration of the terminal device 2. FIG. 3 illustrates a structure of the job information in an embodiment. As illustrated in FIG. 2, the terminal device 2 includes a control unit 11, the storage section 12, a communication interface 13, a keyboard 14, a mouse (not shown), a display 15, and a card reader 16.

The control unit 11 includes a central processing unit (CPU) and a random access memory (RAM). The CPU reads from the storage section 12 a computer program for causing the control unit 11 to function as a job issuer information reception section 21, a job information generation section 22, a communication control section 23, a display control section 24, and an integrated control section 25 which are described later. The CPU executes the computer program to cause the control unit 11 to function as the job issuer information reception section 21, the job information generation section 22, the communication control section 23, the display control section 24, and the integrated control section 25. The RAM is used as a memory when the CPU executes the computer program.

The job issuer information reception section 21 receives identification information on a job issuer that is inputted by the job issuer. The identification information on the job issuer can be, for example, a unique number assigned to the job issuer. The identification information on the job issuer is inputted by the job issuer having the card reader 16 read the identification information recorded in his/her own ID card. The job issuer information reception section 21 receives the identification information on the job issuer from the card reader 16.

The job information generation section 22 generates the job information. In addition, as described later, the job information generation section 22 selects a permitted recipient according to a selection instruction inputted by the job issuer, each time the job information is generated. The job information generation section 22 is an example of a job information generation unit.

As illustrated in FIG. 3, the job information includes management information and print data. The management information includes a management number, the identification information on the job issuer, job control information, reference information on a permitted recipient table, reference information on the print data, and the permitted recipient table.

The management number is a unique number for identifying each of job information items. The identification information on the job issuer is information on the job issuer received by the job issuer information reception section 21 from the card reader 16.

The job control information is a condition for restricting the execution of the job. The job control information includes one of: a first condition information item (represented by, for example, a numerical value equal to 0) indicating that the printing process is permitted until every one of the permitted recipients selected by the job issuer has executed the printing process once; and a second condition information item (represented by, for example, a numerical value equal to or larger than 1, the numerical value indicating the number of persons or the permitted number of times to execute the printing process) indicating that the printing process is prevented after one person or a plurality of persons among the plurality of permitted recipients selected by the job issuer have executed the printing process once, even if all of the permitted recipients selected by the job issuer have not executed the printing process.

The reference information on the permitted recipient table indicates the permitted recipient table, for example, a relative address number of the start of the permitted recipient table with the start of the job information as a reference.

The reference information on the print data indicates the print data, for example, a relative address number of the start of the print data with the start of the job information as a reference.

The permitted recipient table is a table wherein information on the permitted recipients selected by the job issuer is arranged.

The print data indicates printed contents, that is, data corresponding to at least one of the characters and images within a print subject such as a document, a photograph, or a drawing.

The communication control section 23 of FIG. 2 transmits the job information generated by the job information generation section 22 to the job server 3. The communication control section 23 is an example of a first job information transmission unit. The communication control section 23 controls the communications between the terminal device 2 and the authentication server 5 in order to perform authentication on the job issuer.

The display control section 24 displays a list of a plurality of permitted recipients associated with the job issuer onto the display 15. The display control section 24 is an example of a list display unit. The display control section 24 displays a screen for the job control information on the display 15.

The integrated control section 25 integrally controls the terminal device 2. The integrated control section 25 performs an authentication on the job issuer.

The storage section 12 is, for example, a storage device such as a hard disk or a flash memory. Stored in the storage section 12 are identification information items, names, and the like of the plurality of permitted recipients associated with the job issuer. The storage section 12 is an example of a permitted recipient information storage unit. The computer program for causing the control unit 11 to function as the job issuer information reception section 21, the job information generation section 22, the communication control section 23, the display control section 24, and the integrated control section 25.

The communication interface 13 connects the terminal device 2 and the job server 3 with each other so as to allow communications to be performed therebetween and connects the terminal device 2 and the authentication server 5 with each other so as to allow communications therebetween. The keyboard 14 and the mouse are input devices allows the job issuer to input information to the terminal device 2. The display 15 can be, for example, a liquid crystal monitor. The card reader 16 reads the identification information on the job issuer from an ID card recorded with the identification information on the job issuer.

FIG. 4 illustrates an internal configuration of the job server 3. FIG. 5 illustrates the structure of status information generated by the job server 3. As illustrated in FIG. 4, the job server 3 includes a control unit 31, a storage section 32, and a communication interface 33. The job server 3 includes an input/output device (not shown) such as a keyboard, a mouse, and a display.

The control unit 31 includes a CPU and a RAM. The CPU reads, from the storage section 32, a computer program for causing the control unit 31 to function as a communication control section 35 and an integrated control section 36 which are described later. The CPU executes the computer program to cause the control unit 31 to function as the communication control section 35 and the integrated control section 36. The RAM is a working memory when the CPU executes the computer program.

The communication control section 35 receives the job information transmitted from the terminal device 2. In response to a request from the printing apparatus 4, the communication control section 35 transmits the job information stored in the storage section 32 to the printing apparatus 4. The communication control section 35 restricts the transmission of the job information to the printing apparatus 4 according to the conditions included in the job control information of the job information. The communication control section 35 is an example of a first job information reception unit and a second job information transmission unit.

The integrated control section 36 integrally controls the job server 3. The integrated control section 36 generates the status information indicating the execution status of a job related to each of the job information items stored in the storage section 32. As illustrated in FIG. 5, the status information represents information indicating the status (unexecuted or executed) of the job for each of the job information items stored in the storage section 32 and for each of the permitted recipients set forth in the permitted recipient table within each of the job information items.

The storage section 32 is, for example, a storage device such as a hard disk or a flash memory. Stored in the storage section 32 are the job information received by the communication control section 35 and the status information generated by the integrated control section 36. The storage section 32 is an example of a job information storage unit. The computer program for causing the control unit 31 to function as the communication control section 35 and the integrated control section 36 is stored in the storage section 32.

The communication interface 33 connects the job server 3 and the terminal device 2 with each other allowing communication therebetween and connecting the job server 3 and the printing apparatus 4 with each other so as to allow communications therebetween.

FIG. 6 illustrates an internal configuration of the printing apparatus 4. As illustrated in FIG. 6, the printing apparatus 4 includes a control unit 41, a printing-related mechanism 42, a storage section 43, a communication interface 44, and a card reader 45. The printing apparatus 4 further includes an operation panel (not shown) for inputting information such as an instruction and a display (not shown) for displaying information related to the printing processing and the like.

The control unit 41 includes a CPU, a read only memory (ROM), and a RAM. Stored in the ROM is a computer program for allowing the control unit 41 to function as a permitted recipient information reception section 51, a transmission request section 52, a communication control section 53, a job execution section 54, and an integrated control section 55 which are described later. The CPU reads the computer program from the ROM, and executes the computer program to cause the control unit 41 to function as the permitted recipient information reception section 51, the transmission request section 52, the communication control section 53, the job execution section 54, and the integrated control section 55. The RAM is a working memory when the CPU executes the computer program.

The permitted recipient information reception section 51 receives identification information on the permitted recipient input by the permitted recipient. The identification information on the permitted recipient can be, for example, a unique number assigned to the permitted recipient. Inputting the identification information on the permitted recipient is performed by the permitted recipient having the card reader 45 read the identification information recorded in his/her own ID card. The permitted recipient information reception section 51 receives the identification information on the permitted recipient from the card reader 45.

The transmission request section 52 requests the job server 3 to transmit to the communication control section 53 the job information including identification information on a permitted recipient that matches the identification information on the permitted recipient received by the permitted recipient information reception section 51. The transmission request section 52 is an example of a transmission request unit.

The communication control section 53 receives the job information transmitted from the job server 3 in response to the request made by the transmission request section 52. The communication control section 53 controls communications between the printing apparatus 4 and the authentication server 5 in order to authenticate the identification information on the permitted recipient. The communication control section 53 transmits execution result information indicating an execution result of the job to the job server 3.

The job execution section 54 controls the printing-related mechanism 42 to cause the printing process (in other words, job) based on the job information received by the communication control section 53, thereby outputting the printed material.

The integrated control section 55 integrally controls the printing apparatus 4.

The printing-related mechanism 42 includes a document reading mechanism, a sheet containing mechanism, a sheet conveying mechanism, a printing mechanism, and other such mechanisms for executing the printing process. The storage section 43 can be, for example, a hard disk or a flash memory. The communication interface 44 connects the printing apparatus 4 and the job server 3 with each other so as to allow communications therebetween and connects the printing apparatus 4 and the authentication server 5 with each other so as to allow communications therebetween. The card reader 45 reads the identification information on the permitted recipient from an ID card recorded with the identification information on the permitted recipient.

Figure 7:
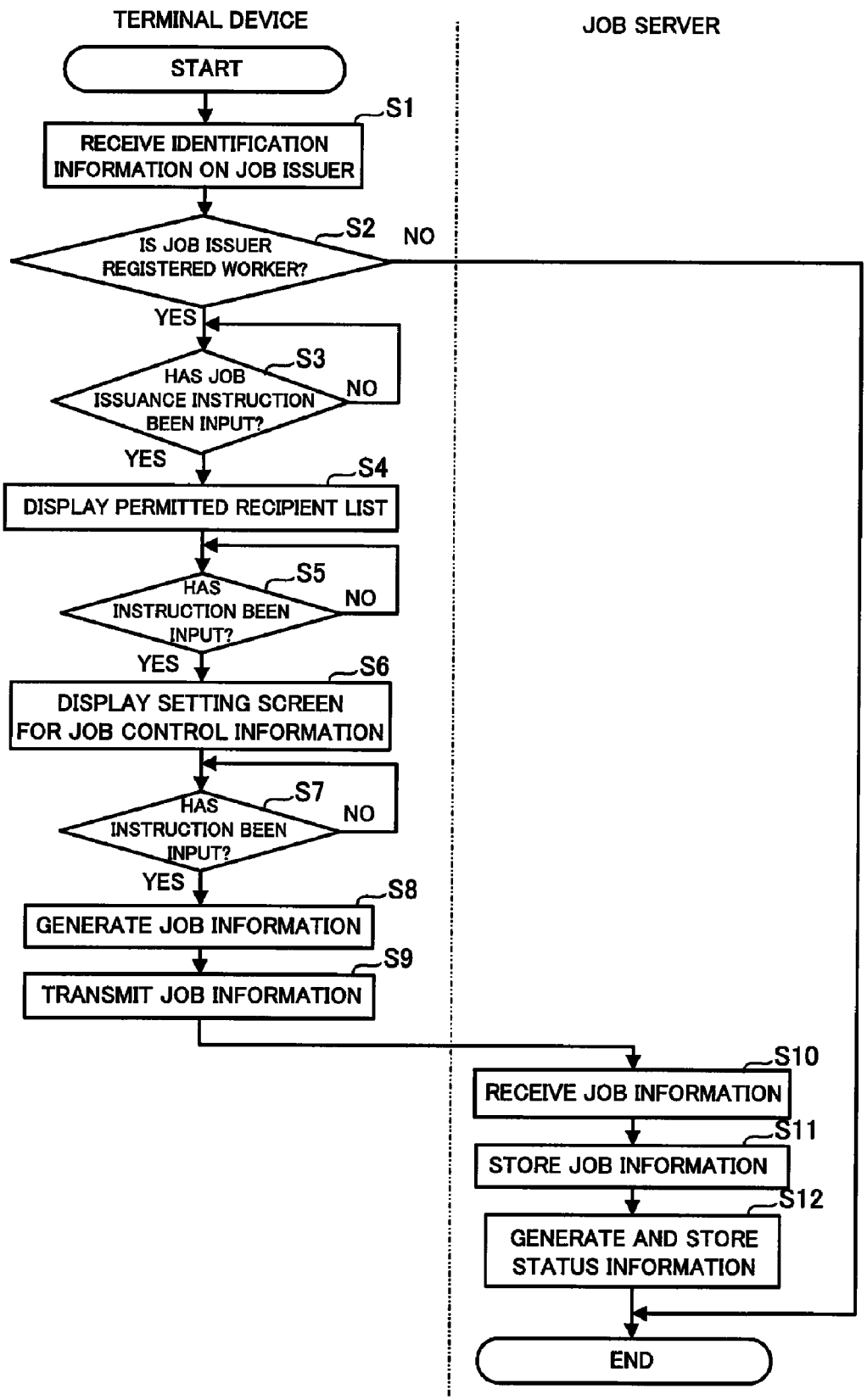
FIG. 7 is a flowchart illustrating the operation of the terminal device and the job server at the time of job issuance according to an embodiment of the present invention.

FIG. 7 illustrates the operation of the terminal device 2 and the job server 3 when a job is issued. In FIG. 7, when a job issuer has the card reader 16 of the terminal device 2 read his/her own ID card, the identification information on the job issuer is output from the card reader 16. The job issuer information reception section 21 of the terminal device 2 receives the identification information on the job issuer from the card reader 16 (Step S1).

There then is an authentication on the job issuer to determine whether or not the job issuer is the registered worker (Step S2). Specifically, the communication control section 23 of the terminal device 2 transmits the identification information on the job issuer, which has been received by the job issuer information reception section 21 in Step S1, to the authentication server 5. Then, the authentication server 5 searches the worker registration information database. If the worker registration information database contains identification information on a worker that matches the identification information on the job issuer transmitted from the terminal device 2, the authentication server 5 transmits, to the terminal device 2, a response signal indicating that the job issuer is the registered worker. Meanwhile, if the worker registration information database does not contain identification information on a worker that matches the identification information on the job issuer transmitted from the terminal device 2, the authentication server 5 transmits a response signal indicating that the job issuer is not a registered worker to the terminal device 2. Then, the communication control section 23 of the terminal device 2 receives the response signal transmitted from the authentication server 5, and based on the response signal, the integrated control section 25 of the terminal device 2 determines whether or not the job issuer is the registered worker. If the job issuer is not the registered worker (Step S2: NO), the integrated control section 25 of the terminal device 2 rejects the operation input from the job issuer.

Meanwhile, if the job issuer is the registered worker (Step S2: YES), the integrated control section 25 of the terminal device 2 subsequently determines whether or not the job issuer inputted a job issuance instruction indicating that a job should be issued to the terminal device 2 (Step S3).

If the job issuer has inputted the job issuance instruction to the terminal device 2 (Step S3: YES), the display control section 24 of the terminal device 2 reads information on a plurality of permitted recipients associated with the job issuer from the storage section 12, and displays a list, in which information items on the plurality of permitted recipients is set forth, onto the display 15 of the terminal device 2 (Step S4). By viewing this list, the job issuer can selectively input to the terminal device 2 the person who is actually permitted to execute the job from among the plurality of permitted recipients associated with the job issuer. Note that the number of persons to be selected may be one or a multiple number. Further, all of the plurality of permitted recipients associated with the job issuer may be selected.

If the job issuer inputs to the terminal device 2 a selection instruction indicating that the person who is actually permitted to execute the job is to be selected (Step S5: YES), the display control section 24 subsequently displays the setting screen for the job control information onto the display 15 (Step S6). While using the setting screen for the job control information, the job issuer can set conditions for restricting the execution of the job. For example, the job issuer can input to the terminal device 2 a selection instruction indicating which of a first condition and a second condition is to be selected, the first condition indicating that the printing process is permitted until every one of the permitted recipients selected by the job issuer has executed the printing process once, the second condition indicating that the printing process is prevented after one person or a select group of persons among a plurality of permitted recipients selected by the job issuer have executed the printing process once even if all of the permitted recipients selected by the job issuer have not executed the printing process. If the second condition is selected, the job issuer can input to the terminal device 2 a numerical value indicating the number of persons or the permitted number of times to execute the printing process.

If the job issuer inputted to the terminal device 2 the selection instruction indicating which of first condition and second condition is to be selected, and as necessary, the numerical value indicating the number of persons and/or the number of times that is permitted to execute the printing process (Step S7: YES), the job information generation section 22 of the terminal device 2 will generate the job information (Step S8). The job information generation section 22 functions as follows. First, the job information generation section 22 generates the print data. Then, according to the selection instruction which has been inputted by the job issuer in Step S5, the job information generation section 22 selects one person or a plurality of persons from among the permitted recipients that is displayed on the display 15. The job information generation section 22 reads the identification information items on the selected permitted recipients from the storage section 12, and generates the permitted recipient table (see FIG. 3) wherein the identification information items on the permitted recipient is set forth. Further, the job information generation section 22 generates the job control information including the condition information which has been selected by the job issuer in Step sS7. The job information generation section 22 generates the management number, the reference information on the permitted recipient table, and the reference information on the print data. Then, as illustrated in FIG. 3, the job information generation section 22 arranges the management number, the identification information on the job issuer, which has been received by the job issuer information reception section 21 in Step S1, the job control information, the reference informa-tion on the permitted recipient table, the reference information on the print data, the permitted recipient table, and the print data.

The communication control section 23 of the terminal device 2 then transmits the job information generated by the job information generation section 22 to the job server 3 (Step S9).

The communication control section 35 of the job server 3 receives the job information transmitted from the terminal device 2 (Step S10), and stores the job information in the storage section 32 (Step S11).

The integrated control section 36 of the job server 3 then generates the status information (see FIG. 5), and stores the status information in the storage section 32 (Step S12). Immediately after the communication control section 35 receives the job information from the terminal device 2, the job execution status for each of the permitted recipients in the permitted recipient table of the job information is "unexecuted", and this status information is generated and stored in the storage section 32.

Figure 8:
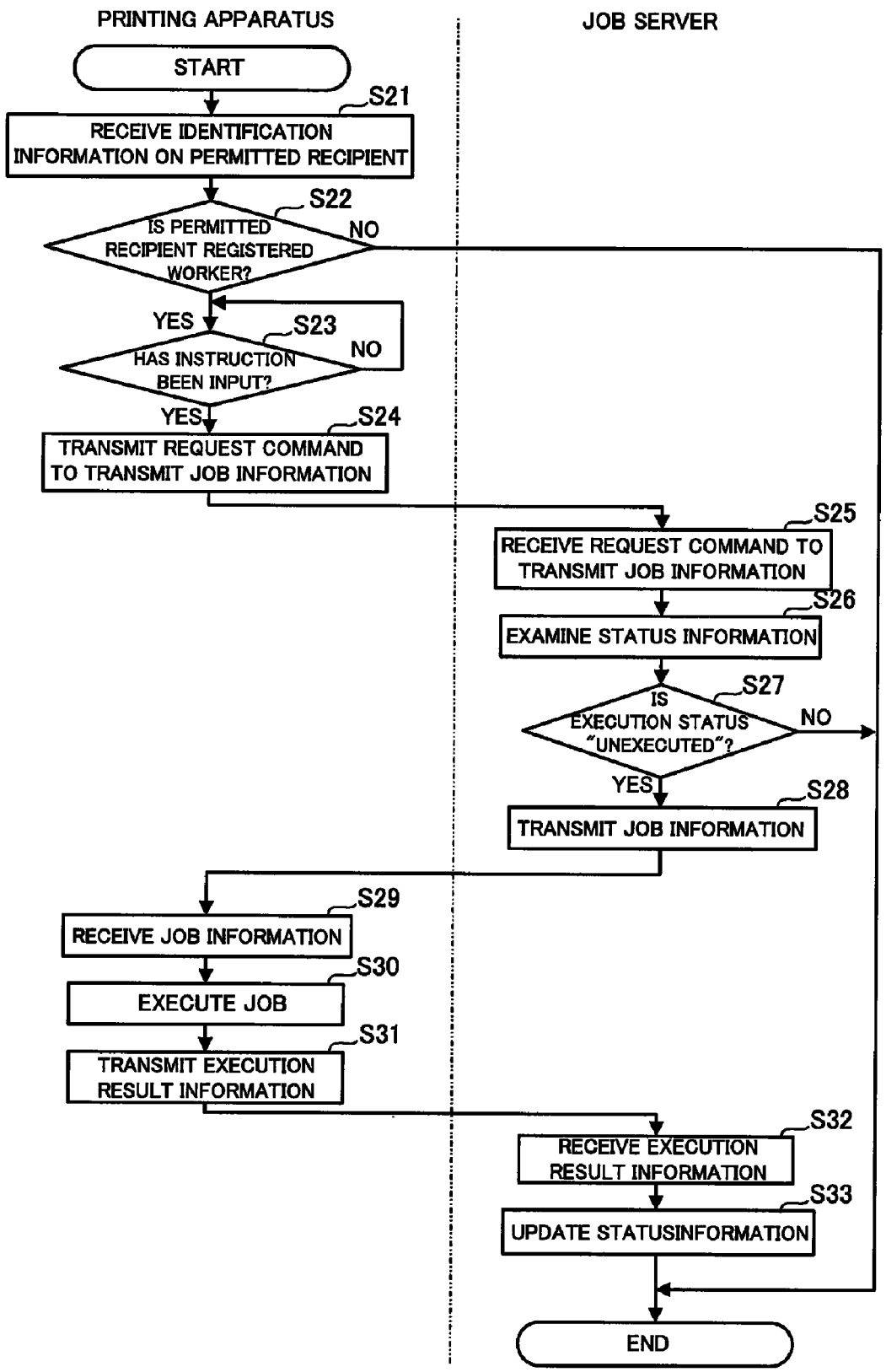
FIG. 8 is a flowchart illustrating the operation of the printing apparatus and the job server at the time of job execution according to an embodiment of the present invention.

FIG. 8 is a flowchart illustrating operation of the printing apparatus 4 and the job server 3 during the execution of a job. It should be noted that FIG. 8 illustrates only an example of where the storage section 32 of the job server 3 stores one job that can be executed by the permitted recipient.

In FIG. 8, when a permitted recipient has the card reader 45 of the printing apparatus 4 read the information stored in his/her own ID card, the identification information on the permitted recipient is outputted from the card reader 45. The permitted recipient information reception section 51 of the printing apparatus 4 receives the identification information on the permitted recipient outputted from the card reader 45 (Step S21).

An authentication is then performed on the permitted recipient to determine whether or not the permitted recipient is the registered worker (Step S22). Specifically, the communication control section 53 of the printing apparatus 4 transmits the identification information on the permitted recipient, which is received by the permitted recipient information reception section 51 in Step S21, to the authentication server 5. Then, the authentication server 5 searches the worker registration information database. If the worker registration information database contains identification information on a worker that matches the identification information on the permitted recipient transmitted from the printing apparatus 4, the authentication server 5 transmits a response signal indicating that the permitted recipient is the registered worker to the printing apparatus 4. If the worker registration information database does not contain identification information on a worker that matches the identification information on the permitted recipient transmitted from the printing apparatus 4, the authentication server 5 transmits a response signal indicating that the permitted recipient is a registered worker to the printing apparatus 4. The communication control section 53 of the printing apparatus 4 receives the response signal transmitted from the authentication server 5, and based on the response signal, the integrated control section 55 of the printing apparatus 4 determines whether or not the permitted recipient is the registered worker. If the permitted recipient is not the registered worker (Step S22: NO), the integrated control section 55 of the printing apparatus 4 rejects the operation input from the permitted recipient.

If the permitted recipient is the registered worker (Step S22: YES), the integrated control section 55 of the printing apparatus 4 then determines whether or not the permitted recipient has inputted a job execution instruction indicating that a job should be executed to the printing apparatus 4 (Step S23).

If the permitted recipient has inputted the job execution instruction to the printing apparatus 4 (Step S23: YES), the transmission request section 52 of the printing apparatus 4 makes a request of the job server 3 to transmit thereto the job information including the identification information on the permitted recipient that matches the identification information on the permitted recipient received by the permitted recipient information reception section 51 (Step S24). Specifically, the transmission request section 52 transmits to the job server 3 a request command indicating that a request is to be made and the identification information on the permitted recipient received by the permitted recipient information reception section 51.

The communication control section 35 of the job server 3 receives the request command and the identification information on the permitted recipient that are transmitted from the printing apparatus 4 (Step S25).

The integrated control section 36 of the job server 3 then examines the job execution status for the permitted recipient (Step S26). That is, the integrated control section 36 reads, from the storage section 32 of the job server 3, the status information corresponding to the job information including the identification information on the permitted recipient that matches the identification information on the permitted recipient transmitted from the printing apparatus 4. Based on the status information, the integrated control section 36 examines the execution status of the job related to the job information for the permitted recipient.

If the job execution status is "executed" (Step S27: NO), the communication control section 35 transmits a response signal indicating that the job execution status is "executed" to the printing apparatus 4. The printing apparatus 4, which has received the response signal, displays that the job is "executed" on the display of the printing apparatus 4, and rejects the execution of the job related to the job information.

Meanwhile, if the job execution status is "unexecuted" (Step S27: YES), the communication control section 35 reads, from the storage section 32, the job information including the identification information on the permitted recipient that matches the identification information on the permitted recipient transmitted from the printing apparatus 4, and transmits the job information to the printing apparatus 4 (Step S28).

The communication control section 53 of the printing apparatus 4 then receives the job information transmitted from the job server 3 (Step S29), and executes the job related to the job information (Step S30). Therefore, the printing process based on the job information is performed, and the printed material is outputted from the printing apparatus 4. The permitted recipient receives the printed material.

The communication control section 53 of the printing apparatus 4 then transmits to the job server 3 execution result information indicating that the permitted recipient has executed the job related to the job information (Step S31). The execution result information includes: the management number of the job information to which the currently executed job is related; and the identification information on the permitted recipient who has executed the job.

The communication control section 53 of the job server 3 receives the execution result information transmitted from the printing apparatus 4 (Step S32). The integrated control section 55 of the job server 3 then updates the status information based on the execution result information received (Step S33).

By way of example, the updating process of the status information is performed as follows. First, based on the execution result information, the integrated control section 55 identifies: the job information to which the currently executed job is related; and the identification information on the permitted recipient who has executed the job. Then, the integrated control section 55 reads the conditions included in the job control information of the identified job information. If the conditions indicate the first condition, the integrated control section 55 changes the execution status of the job related to the job information for the identified permitted recipient, to "executed".

Meanwhile, if the above-described conditions contained in the information indicates the second condition, and if the number of persons or the permitted number of times to execute the printing process is equal to 1, the integrated control section 55 changes the execution status of the job for every permitted recipient in the status information corresponding to the identified job information, to "executed".

On the other hand, if the above-described information indicates the second condition, and if the number of persons or the number of permitted times is equal to or greater than 2, the integrated control section 55 counts the number of permitted recipients whose job execution statuses are "executed" in the status information corresponding to the identified job information. Then, if the number obtained by adding 1 to the counted number is less than the number of persons or the number of permitted times, the integrated control section 55 changes the execution status of the job related to the job information for each of the identified permitted recipients, to "executed". Meanwhile, if the number obtained by adding 1 to the number of permitted recipients whose job execution statuses described above are "executed" is equal to or greater than the number of persons or the number of permitted times, the integrated control section 55 changes the execution status of the job for every permitted recipient in the status information corresponding to the identified job information, to "executed".

As described above, according to the printing system 1, the job issuer can allow a worker other than the job issuer, in other words, the permitted recipient, to execute the job generated by the job issuer himself/herself. Therefore, for example, a given worker can have his/her own subordinate perform the job issued by the worker himself/herself. Additionally, the permitted recipient can be decided in advance. Accordingly, for example, the job issuer can ensure security by deciding a trusted person as the permitted recipient. As a result, according to the printing system 1, it is possible to make a system that is more convenient without sacrificing security.

In the printing system 1, when issuing the job, the job issuer can select the permitted recipient who is actually permitted to execute the job from among permitted recipient candidates associated with the job issuer. Therefore, the job issuer can arbitrarily select the permitted recipient for each specific job. Accordingly, in the printing system 1, it is possible to prevent unauthorized access to information with respect to the type, content, and properties of a document, a photograph, a drawing, or the like to be printed.

In addition, in the printing system 1, the job issuer can select the conditions for restricting the execution of the job. If the job issuer selects the first condition, indicating that every one of the permitted recipients selected by the job issuer is permitted to execute the printing processing once, the job issuer can distribute the printed material to all of the selected permitted recipients. Meanwhile, if the job issuer selects the second condition, indicating that the printing processing is inhibited after one person or a plurality of persons among the plurality of permitted recipients selected by the job issuer have executed the printing processing once, the job issuer can have only the one person or the plurality of persons among the selected permitted recipients receive the printed material. In this case, the job is finished even if all of the permitted recipients have not executed the printing processing. Therefore, according to the printing system 1, the job issuer can arbitrarily set a number and type of persons who actually receive the printed matter according to circumstances in which another worker is requested to receive the printed material, a distribution pattern of the printed material, a usage pattern of the printing system 1. As a result, it is possible to enhance the convenience and the versatility of the system while ensuring the security.

It should be noted that the above-described printing system 1 has been described by taking as an example the situation where the authentication is performed on the job issuer and the permitted recipient by using the ID card, but the present invention is not limited thereto. For example, inputting of a password or biometric authentication such as fingerprint authentication may be used to perform the authentication on the job issuer or the permitted recipient.

Moreover, the printing system 1 has been described by taking as an example the situation where the identification information on the permitted recipient associated with the job issuer is stored in the storage section 12 of the terminal device 2, but the present invention is not limited thereto. The identification information on the permitted recipient associated with the job issuer may be stored on the authentication server 5. Using such a configuration, the job issuer can manage persons who can be selected as recipients of the printed material in a more centralized manner by the authentication server 5, which results in higher security.

Further, the printing system 1 has been described by taking as an example the situation where the job issuer selects recipients who are actually permitted to execute the job in units of the permitted recipient from among candidates for the permitted recipients associated with the job issuer, but the present invention is not limited thereto. For example, the printing system 1 may be designed so that the worker presets one or more subgroups each composed of a plurality of permitted recipients, and that the job issuer selects a subgroup from among those subgroups to thereby collectively select the plurality of permitted recipients who are actually permitted to execute the job.

Additionally, the printing system 1 has been described by taking as an example the situation where the job issuer always selects at least one permitted recipient who is actually permitted to execute the job from among the candidates for the permitted recipients associated with the job issuer, but the present invention is not limited thereto. The printing system 1 may be designed so that unless the job issuer inputs to the terminal device 2 a special instruction indicating that the permitted recipient who is actually permitted to execute the job is to be selected from among the candidates for the permitted recipients associated with the job issuer, all of the candidates for the permitted recipients associated with the job issuer are set as the permitted recipients who are actually permitted to execute the job. In this case, for example, the worker presets all members of a department, to which the job issuer belongs, as permitted recipients associated with the job issuer. This makes it possible for the members of the department to freely receive printed material of another member from each other, which is convenient. Meanwhile, no one but the members of the department can receive the printed material, which ensures the security.

Further, according to the printing system 1, the job issuer can select the person who is actually permitted to execute the job from the list of permitted recipients associated with the job issuer. In order to make it easier to perform the selection, the printing system 1 may be configured so that the names of permitted recipients previously selected by the job issuer are highlighted in the list. Further, the printing system 1 may be configured so that the name of the permitted recipient previously selected by the job issuer is located on top of the list. In order to achieve such a function, when the job issuer selects the permitted recipient, the selection result, for example, the identification information on the selected permitted recipient is stored in the storage section 12 of the terminal device 2 or the like (selection result storage means).

The printing system 1 has been described using as an example the situation where the job issuer makes selection from the first condition and the second condition for executing the job, but the present invention is not limited thereto. For example, a condition such as one wherein every one of the permitted recipients selected by the job issuer can execute the printing processing any number of times may be used.

The printing system 1 has been described using as an example the situation where the communication control section 35 of the job server 3 restricts the transmission of the job information stored in the storage section 32 to the printing apparatus 4 according to the first condition or the second condition included in the job control information of the job information, but the present invention is not limited thereto. The printing system 1 may be designed so that the job information is transmitted from the job server 3 to the printing apparatus 4 irrespective of the first condition or the second condition, and that the job execution section 54 of the printing apparatus 4 restricts the execution of the printing process based on the job information received from the job server 3 according to the first condition or the second condition.

Further, the printing system 1 has been described referring to FIG. 8 as illustrating the example where one job that can be executed by the permitted recipient is stored in the storage section 32 of the job server 3. If two or more jobs, that can be executed by the permitted recipient, are stored in the storage section 32 of the job server 3, the printing system 1 operates, for example, in the following manner. That is, there are two cases where one worker executes a job as follows. In one case, the one worker himself/herself executes the job issued by the one worker who serves as the job issuer. In the other case, the first worker who serves as the permitted recipient executes the job issued by another worker with the first worker selected as the permitted recipient. Therefore, when the first worker requests the printing apparatus 4 to execute the job, the storage section 32 of the job server 3 may store therein the job issued by the first worker and the job issued by the other worker with the first worker selected as the permitted recipient. In this situation, there can be an issue in which order those two different jobs are to be executed. The printing system 1 is provided with a first mode, in which the other worker executes the job issued by the first worker as a higher priority than the job issued by the other worker with the first worker selected as the permitted recipient. And a second mode, in which the first worker executes the job issued by the other worker with the first worker selected as the permitted recipient as a higher priority than the job issued by the first worker. Then, the worker can selectively set the first mode and the second mode for each job or for each worker. Such a design may be achieved by, for example, by including information indicating such mode setting in the management information of the job information, or in the worker registration information stored in the worker registration information database included in the authentication server 5.

The printing system 1 has been described by referring to FIG. 3 as illustrating an example wherein the terminal device generates the job information having a design in which the management information and the print data are combined, but the present invention is not limited thereto. In the job information, the management information and the print data may be separate data items (files). For example, the printing system 1 may be designed so that the management information and the print data are associated with each other by including a description of a file name of the print data in the management information. Further, in a similar method, the permitted recipient table may be detached from the management information.

In a printing system according to another embodiment of the present invention, the printing apparatus has a job server function. The printing system 1 includes the terminal device 2, the printing apparatus 4, and the authentication server 5. The terminal device 2 is connected to the authentication server 5 via the computer network, or the like, so as to allow communications therebetween. The printing apparatus 4 is connected to the authentication server 5 via the computer network, or the like, so as to allow communications therebetween.

In the same manner as for the previous embodiment, the printing system 1 has the job executer expansion function. That is, in the printing system 1, in the case where a given worker requests the terminal device 2 to issue a job, not only the given worker who has issued the job but also another worker selected by the given worker can execute the job (in other words, the printing process).

The internal configuration of the terminal device 2 is the same as in the previous embodiment, and hence description thereof is omitted.

The printing apparatus 4 includes the control unit 41, the printing-related mechanism 42, the storage section 43, the communication interface 44, and the card reader 45. The printing apparatus 4 further includes an operation panel (not shown) for inputting information such as an instruction and a display (not shown) for displaying information related to the printing process and the like.

The control unit 41 includes a CPU, a ROM, and a RAM. Stored in the ROM is a computer program for allowing the control unit 41 to function as the permitted recipient information reception section 51, the communication control section 53, the job execution section 54, and the integrated control section 55 which are described later. The CPU reads the computer program from the ROM. The CPU executes the computer program causing the control unit 41 to function as the permitted recipient information reception section 51, the communication control section 53, the job execution section 54, and the integrated control section 55. The RAM is a working memory when the CPU executes the computer program.

The permitted recipient information reception section 51 receives the identification information on the permitted recipient inputted by the permitted recipient. The identification information on the permitted recipient can be, for example, a unique number assigned to the permitted recipient. The inputting of the identification information on the permitted recipient is performed by the permitted recipient having the card reader 45 read his/her own ID card. The permitted recipient information reception section 51 receives the identification information on the permitted recipient from the card reader 45.

The communication control section 53 receives the job information transmitted from the terminal device 2.

The job execution section 54 controls the printing-related mechanism 42 to execute the printing process (in other words, job) based on the job information received by the communication control section 53 and outputs the printed material.

The integrated control section 55 integrally controls the printing apparatus 4.

The printing-related mechanism 42 includes a document reading mechanism, a sheet containing mechanism, a sheet conveying mechanism, a printing mechanism, and other mechanisms for executing the printing process. The storage section 43 is, for example, a hard disk or a flash memory. The communication interface 44 is an interface for connecting the terminal device 2 and the printing apparatus 4 with each other so as to allow communications therebetween and connecting the printing apparatus 4 and the authentication server 5 with each other so as to allow communications therebetween. The card reader 45 is a device for reading the identification information on the permitted recipient from an ID card recorded with the identification information on the permitted recipient.

Figure 9:
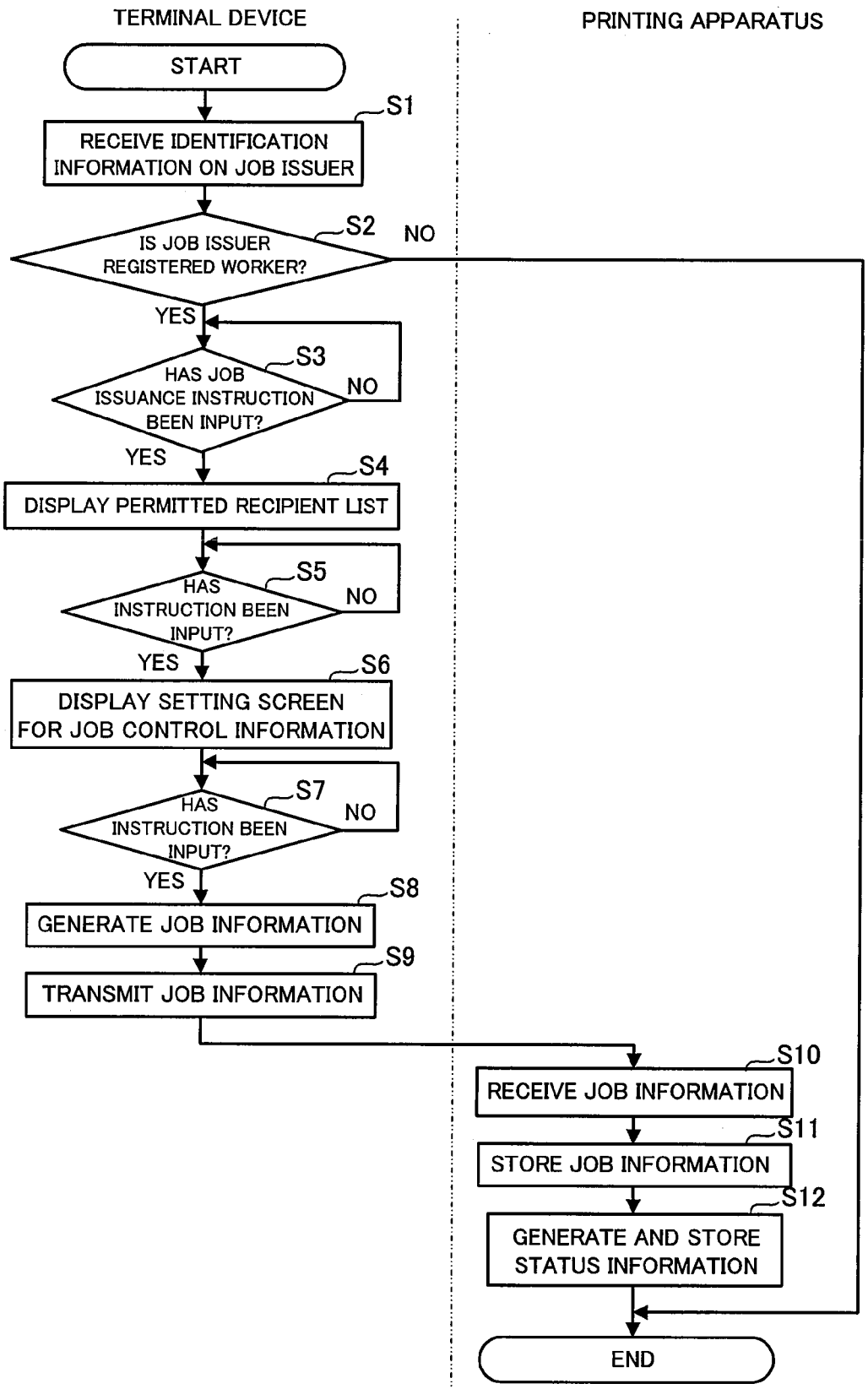
FIG. 9 is a flowchart illustrating the operation of the terminal device and the printing apparatus at the time of job issuance according to another embodiment of the present invention.

FIG. 9 illustrates the operation of the terminal device 2 and the printing apparatus 4 when a job is issued. The operation corresponding to Steps S1 to S8 of FIG. 9 is the same as in the first embodiment, and hence description thereof is omitted.

The communication control section 23 of the terminal device 2 transmits the job information generated by the job information generation section 22 to the printing apparatus 4 (Step S9).

The communication control section 53 of the printing apparatus 4 then receives the job information transmitted from the terminal device 2 (Step S10), and stores the received job information in the storage section 43 of the printing apparatus 4 (Step S11).

The integrated control section 55 of the printing apparatus 4 then generates the status information (see FIG. 5), and stores the status information in the storage section 43 (Step S12). Immediately after the communication control section 53 of the printing apparatus 4 receives the job information transmitted from the terminal device 2, the job execution status for each of the permitted recipients set forth within the permitted recipient table of the job information is "unexecuted", and status information to that effect is generated and stored into the storage section 43.

Figure 10:
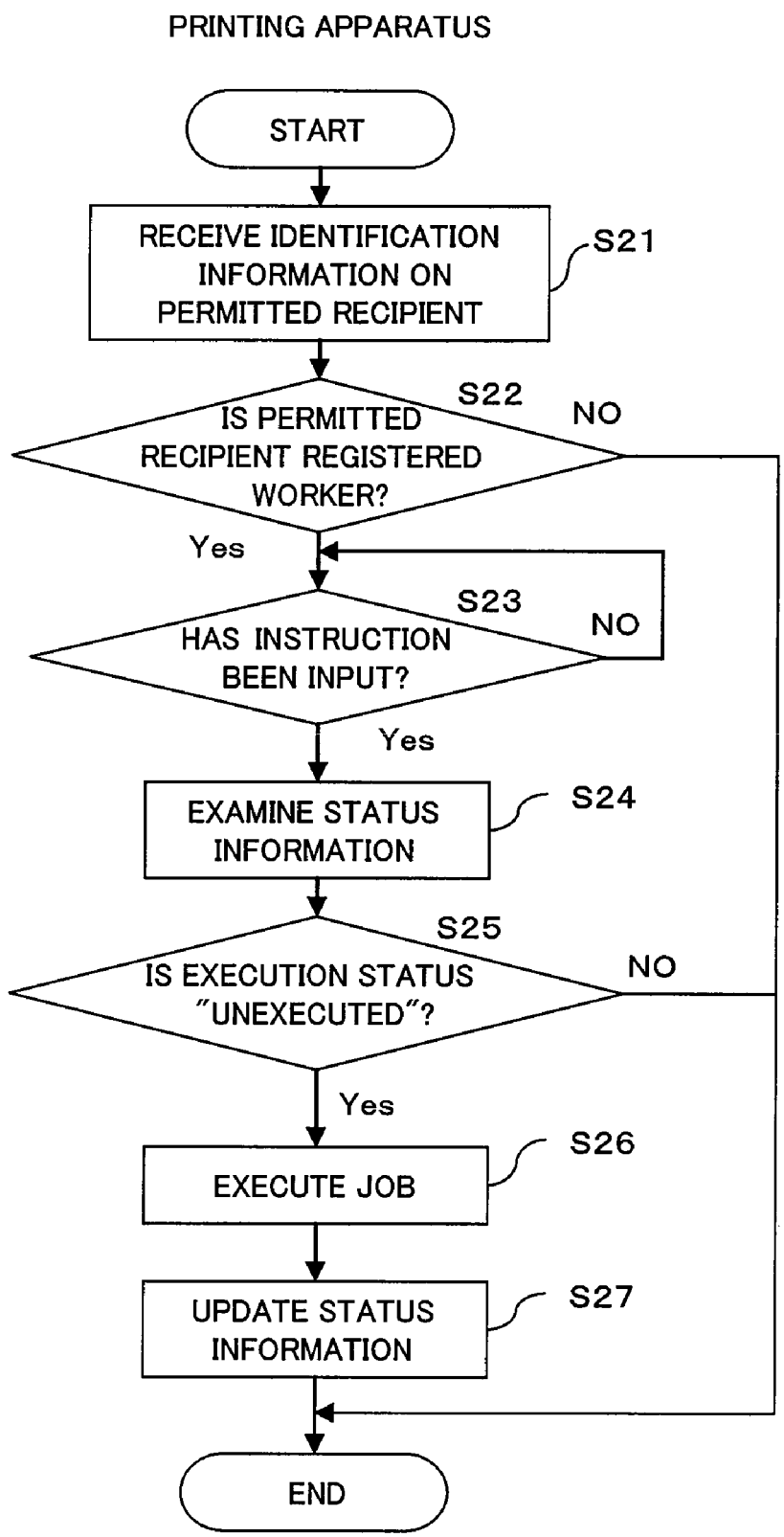
FIG. 10 is a flowchart illustrating the operation of the printing apparatus at the time of job execution according to the another embodiment of the present invention.

FIG. 10 is a flowchart illustrating the operation of the printing apparatus 4 when the job is executed.

In FIG. 10, when a permitted recipient has the card reader 45 of the printing apparatus 4 read the identification information stored in his/her own ID card, the identification information on the permitted recipient is outputted from the card reader 45. The permitted recipient information reception section 51 of the printing apparatus 4 receives the identification information on the permitted recipient outputted from the card reader 45 (Step S21).

Authentication is then performed on the permitted recipient to determine whether or not the permitted recipient is the registered worker (Step S22). Specifically, the communication control section 53 of the printing apparatus 4 transmits the identification information on the permitted recipient, which is received by the permitted recipient information reception section 51 in Step S21, to the authentication server 5. The authentication server 5 searches the worker registration information database. If the worker registration information database contains identification information on a worker that matches the identification information on the permitted recipient transmitted from the printing apparatus 4, the authentication server 5 transmits a response signal indicating that the permitted recipient is the registered worker to the printing apparatus 4. Meanwhile, if the worker registration information database does not contain identification information on a worker that matches the identification information on the permitted recipient transmitted from the printing apparatus 4, the authentication server 5 transmits a response signal indicating that the permitted recipient is not a registered worker to the printing apparatus 4. The communication control section 53 of the printing apparatus 4 receives the response signal transmitted from the authentication server 5, and based on the response signal, the integrated control section 55 of the printing apparatus 4 determines whether or not the permitted recipient is the registered worker. If the permitted recipient is not the registered worker (Step S22: NO), the integrated control section 55 of the printing apparatus 4 rejects the operation input from the permitted recipient.

Meanwhile, if the permitted recipient is the registered worker (Step S22: YES), the integrated control section 55 of the printing apparatus 4 determines whether or not the permitted recipient has inputted a job execution instruction indicating that a job should be executed to the printing apparatus 4 (Step S23).

If the permitted recipient inputs a job execution instruction to the printing apparatus 4 (Step S23: YES), the integrated control section 55 of the printing apparatus 4 examines the job execution status for the permitted recipient (Step S24). That is, the integrated control section 55 reads from the storage section 43 the status information corresponding to the job information, including the identification information on the permitted recipient that matches the identification information on the permitted recipient received by the permitted recipient information reception section 51, and based on the status information, examines the execution status of the job related to the job information for the permitted recipient.

If the job execution status is "executed" (Step S25: NO), the printing apparatus 4 displays that the job is "executed" on the display of the printing apparatus 4, and rejects the execution of the job related to the job information.

Meanwhile, if the job execution status is "unexecuted" (Step S25: YES), the job execution section 54 executes the job related to the job information (Step S26). Therefore, the printing process based on the job information is executed, and the printed material is outputted from the printing apparatus 4. The permitted recipient receives the printed material.

Subsequently, the integrated control section 55 of the printing apparatus 4 updates the status information (Step S27). The updating of the status information is the same as in the previous embodiment, and hence description thereof is omitted.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A printing system, comprising:
   a terminal device;
   a server device; and
   a printing apparatus,
   the terminal device comprising:
   a permitted recipient information storage unit configured to store identification information with respect to a permitted recipient associated with a job issuer;
   a job information generation unit configured to read the identification information with respect to the permitted recipient from the permitted recipient information storage unit, and generate job information including (i) identification information on the job issuer, (ii) the identification information on the permitted recipient, (iii) job control information including one of first condition information and second condition information selected by the job issuer, wherein the first condition information indicates that a printing process is permitted until every one of the plurality of the permitted recipients associated with the job issuer has executed the printing process at least once, and wherein the second condition information indicates that the printing process is prevented after one or the plurality of the recipients among the plurality of the permitted recipients associated with the job issuer have executed the printing process once even if all of the plurality of the permitted recipients associated with the job issuer have not executed the printing process, and (iv) print data; and
   a first job information transmission unit configured to transmit the job information generated by the job information generation unit to the server device,
   the server device comprising:
   a first job information reception unit configured to receive the job information transmitted by the first job information transmission unit;
   a job information storage unit configured to store the job information received by the first job information reception unit; and
   a second job information transmission unit configured to transmit the job information stored in the job information storage unit to the printing apparatus in response to a request made by the printing apparatus,
   the printing apparatus comprising:
   a permitted recipient information reception unit configured to receive the identification information with respect to the permitted recipient;
   a transmission request unit configured to make a request of the server device to transmit, to a second job information reception unit, the job information including identification information on a permitted recipient, which matches the identification information with respect to the permitted recipient received by the permitted recipient information reception unit;
   the second job information reception unit configured to receive the job information transmitted from the second job information transmission unit in response to the request made by the transmission request unit; and
   a job execution unit configured to execute the printing process based on the job information received by the second job information reception unit, and output printed material related thereto.

2. The printing system according to claim 1, wherein:
   the terminal device comprises a list display unit for displaying a list of a plurality of the permitted recipients associated with the job issuer; and
   the job information generation unit reads, from the permitted recipient information storage unit, identification information with respect to permitted recipients that are selected from among the plurality of the permitted recipients displayed by the list display unit, and generates the job information including the read identification information with respect to the selected permitted recipients.

3. The printing system according to claim 2, wherein the job information generation unit selects the permitted recipients each time the job information generation unit generates the job information.

4. The printing system according to claim 2, wherein:
the terminal device comprises a selection result storage unit for storing the selected plurality of the permitted recipients.

5. The printing system according to claim 1, wherein:
the second job information transmission unit restricts the transmitting of the job information stored in the job information storage unit to the printing apparatus according to one of the first condition information and the second condition information included in the job control information of the job information.

6. The printing system according to claim 1, wherein:
the job execution unit restricts the printing process based on the job information received by the second job information reception unit according to one of the first condition information and the second condition information included in the job control information of the job information.

7. A printing system, comprising:
a terminal device; and
a printing apparatus,
the terminal device comprising:
a permitted recipient information storage unit configured to store identification information with respect to a permitted recipient associated with a job issuer;
a job information generation unit configured to read the identification information with respect to the permitted recipient from the permitted recipient information storage unit, and generate job information including (i) identification information on the job issuer, (ii) the identification information with respect to the permitted recipient, (iii) job control information including one of first condition information and second condition information selected by the job issuer, wherein the first condition information indicates that a printing process is permitted until every one of the plurality of the permitted recipients associated with the job issuer has executed the printing process at least once, and wherein the second condition information indicates that the printing process is prevented after one or the plurality of the recipients among the plurality of the permitted recipients associated with the job issuer have executed the printing process once even if all of the plurality of the permitted recipients associated with the job issuer have not executed the printing process, and (iv) print data; and
a job information transmission unit configured to transmit the job information generated by the job information generation unit to the printing apparatus,
the printing apparatus comprising:
a job information reception unit configured to receive the job information transmitted by the job information transmission unit;
a job information storage unit configured to store the job information received by the job information reception unit;
a permitted recipient information reception unit configured to receive the identification information with respect to the permitted recipient; and
a job execution unit configured to execute a printing process based on the job information including identification information with respect to a permitted recipient, which matches the identification information with respect to the permitted recipient received by the permitted recipient information reception unit, and outputting printed material related thereto.

8. The printing system according to claim 7, wherein:
the terminal device comprises a list display unit for displaying a list of a plurality of the permitted recipients associated with the job issuer; and
the job information generation unit reads, from the permitted recipient information storage unit, identification information with respect to permitted recipients that are selected from among the plurality of the permitted recipients displayed by the list display unit, and generates the job information including the read identification information with respect to the selected permitted recipients.

9. The printing system according to claim 8, wherein the job information generation unit performs the selection of permitted recipients each time the job information generation unit generates the job information.

10. The printing system according to claim 8, wherein:
the terminal device further comprises a selection result storage unit for storing the selected permitted recipients.

11. The printing system according to claim 7, wherein:
the job information transmission unit restricts transmission of the job information stored in the job information storage unit to the printing apparatus according to one of the first condition information and the second condition information included in the job control information of the job information.

12. The printing system according to claim 7, wherein:
the job execution unit restricts the printing process based on the job information received by the job information reception unit according to one of the first condition information and the second condition information included in the job control information of the job information.

13. A printing method comprising:
providing a terminal, a server, and a printer;
via the terminal,
storing identification information on a permitted recipient associated with a job issuer;
reading the identification information with respect to the permitted recipient;
generating job information including (i) identification information on the job issuer, (ii) the identification information with respect to the permitted recipient, (iii) job control information including one of first condition information and second condition information selected by the job issuer, wherein the first condition information indicates that a printing process is permitted until every one of the plurality of the permitted recipients associated with the job issuer has executed the printing process at least once, and wherein the second condition information indicates that the printing process is prevented after one or the plurality of the recipients among the plurality of the permitted recipients associated with the job issuer have executed the printing process once even if all of the plurality of the permitted recipients associated with the job issuer have not executed the printing process, (iv) and print data; and
transmitting the job information to the server,
via the server,
receiving the job information from the terminal;
storing the job information;
transmitting the job information to the printer in response to a request made by the printer;

receiving the identification information with respect to the permitted recipient;

making a request of the server to transmit the job information including the identification information on the permitted recipient, which matches the identification infor mation with respect to the permitted recipient received by the printer; and executing the printing process based on the job information received and outputting printed material related thereto.

* * * * *